United States Patent [19]
Neidhart

[11] 4,146,419
[45] Mar. 27, 1979

[54] WELDING DEVICE FOR WELDING PLASTIC STRIPS

[75] Inventor: Wolfgang Neidhart, Sarnen, Switzerland

[73] Assignee: Sarna Kunststoff AG, Switzerland

[21] Appl. No.: 892,256

[22] Filed: Mar. 31, 1978

Related U.S. Application Data

[63] Continuation of Ser. No. 763,519, Jan. 28, 1977, abandoned.

[30] Foreign Application Priority Data

Jan. 30, 1976 [CH] Switzerland .................. 1181/76
Dec. 22, 1976 [CH] Switzerland .................. 16161/76

[51] Int. Cl.² .................. B32B 31/00; B44C 7/00
[52] U.S. Cl. .................. 156/391; 156/499; 156/555; 156/574
[58] Field of Search .............. 156/583, 499, 574, 555, 156/391

[56] References Cited

U.S. PATENT DOCUMENTS

| 2,387,566 | 10/1945 | Custer ................... | 156/499 |
| 2,556,476 | 6/1951 | Lamport ................. | 156/391 |
| 2,751,966 | 6/1956 | Techtmann .............. | 156/574 |
| 2,982,334 | 5/1961 | Cooper et al. .......... | 156/583 |

FOREIGN PATENT DOCUMENTS 500825 12/1970 Switzerland .................. 156/499

*Primary Examiner*—Douglas J. Drummond
*Attorney, Agent, or Firm*—Craig & Antonelli

[57] ABSTRACT

A welding device is provided for welding plastic strips or the like to one another which includes a mounting frame carrying an upper welding shoe with rollers engageable with an upper strip of plastic as well as a lower welding shoe with rollers engaged against a lower strip to be welded. The upper and lower shoes are rigidly connected by the frame so that the complete welding device is supported exclusively at the welding strips with no requirement for further backing for the strips being welded other than the lower welding shoe.

38 Claims, 11 Drawing Figures

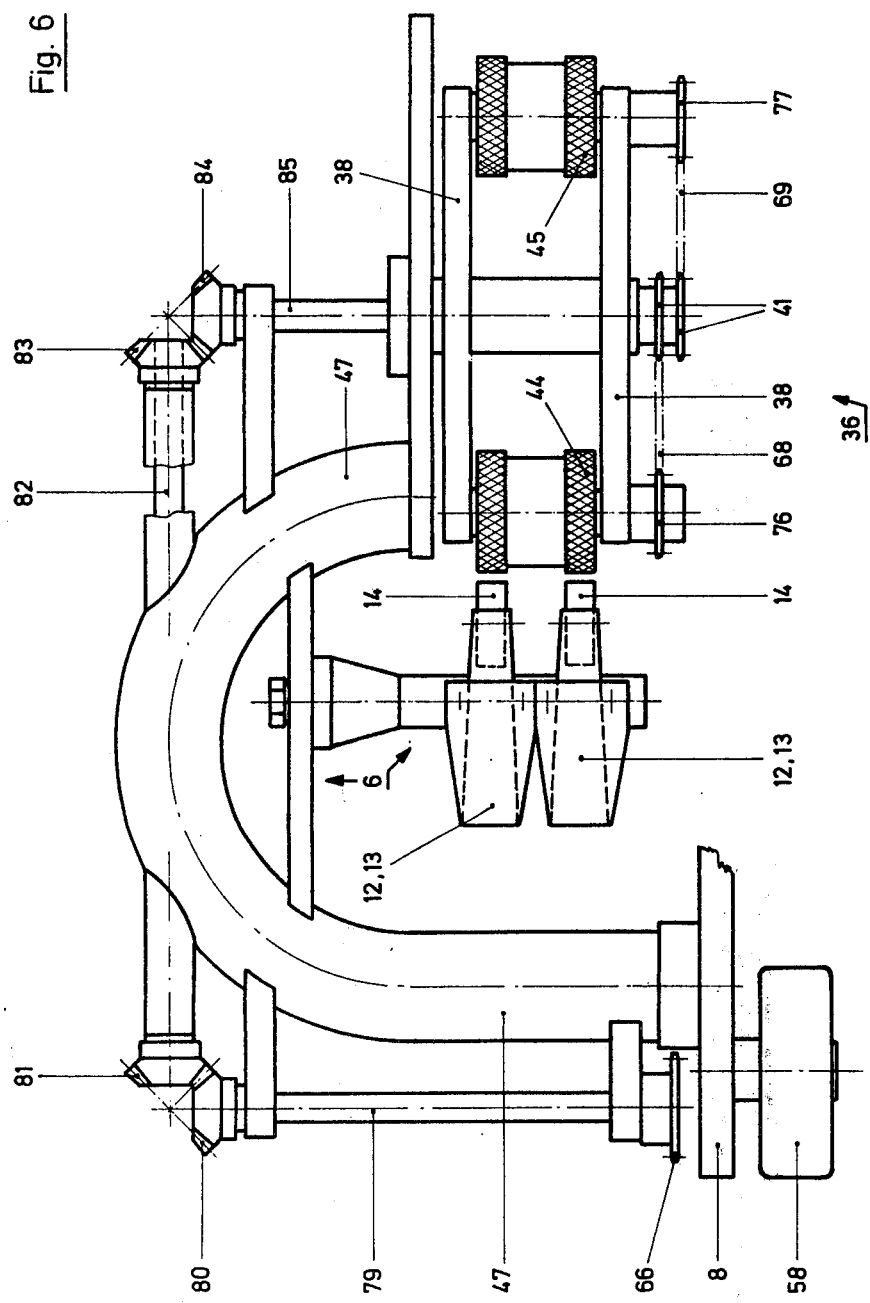

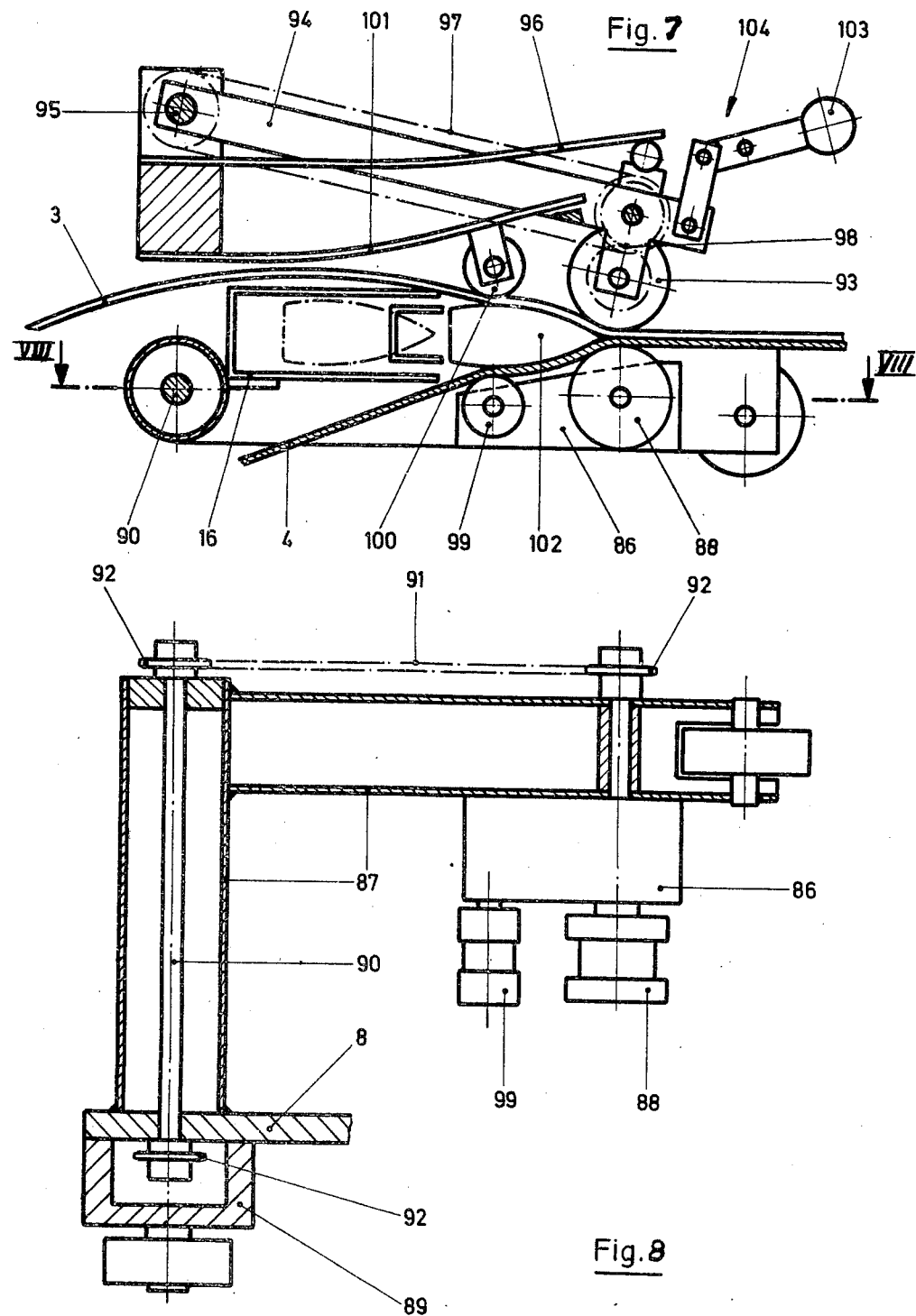

WELDING DEVICE FOR WELDING PLASTIC STRIPS

This is a continuation of application Ser. No. 763,519, filed Jan. 28, 1977 now abandoned.

BACKGROUND AND SUMMARY OF THE INVENTION

The present invention relates to a welding device for welding plastic strips, with a mounting frame and heating part to heat the strips.

When lining structures, for example tunnels, with plastic strips, the difficulty arises in welding because the plastic strips to be welded must provide a correct backing surface for the welding device or parts thereof; otherwise the weld will be defective. Structures to be lined generally do not have smooth surfaces which can serve as backing surfaces for the plastic strips during the welding process, so that an attempt has been made to remedy this shortcoming when lining such structures by bending the ends of the strips backward in the shape of the letter L and welding their undersides together. This may be successful in the case of thin plastic strips since the welded point can be shifted to one of the levels of the plastic strip and welded there again. This method is not practical for thicker plastic strips, for example those several millimeters thick.

Therefore, an object of the invention is to provide a welding device which is independent of the nature of the surface to be welded and still makes it possible to perform lap welding of the two ends or edges of the plastic strip in their planes, said welding being both qualitatively perfect and economically feasible.

A welding device of this kind is characterized according to an important aspect of the invention by a lower welding shoe which is provided directly beneath an upper welding shoe; said lower welding shoe forming a part of the welding device and being mechanically firmly mounted to the mounting frame or the upper welding shoe in order to form a unit which is supported exclusively on the material being welded during the welding process. With this arrangement, one can achieve a reliable and good weld even with a poor backing.

These and further objects, features and advantages of the present invention will become more obvious from the following description when taken in connection with the accompanying drawings which show, for purposes of illustration, several embodiments in accordance with the present invention.

BRIEF DESCRIPTION OF THE DRAWINGS

FIG. 6 is a part sectional schematic view of the welding device according to FIGS. 4 and 5, sectioned along line VI—VI in FIG. 1;

FIG. 7 is a partial schematic part sectional side view of a welding device constructed in accordance with another preferred embodiment of the present invention, with a showing overlapping edges of plastic strips being welded;

FIG. 8 is a structural schematic sectional view along line VIII—VIII in FIG. 7;

DETAILED DESCRIPTION OF THE DRAWINGS

Figure 1:
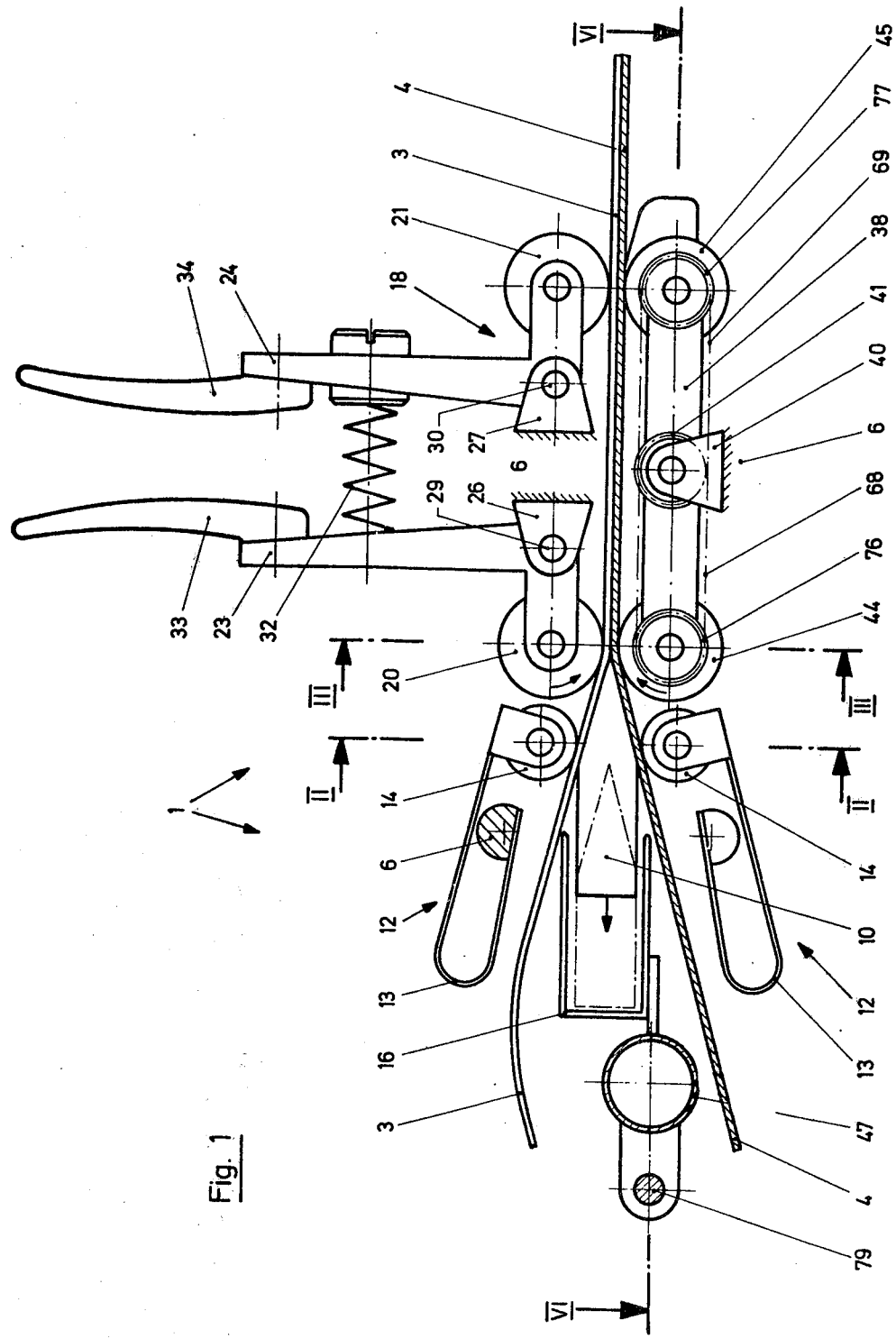
FIG. 1 is a partial schematic part sectional side view of a welding device constructed in accordance with a preferred embodiment of the present invention, with a showing overlapping edges of plastic strips being welded.
Figure 3:
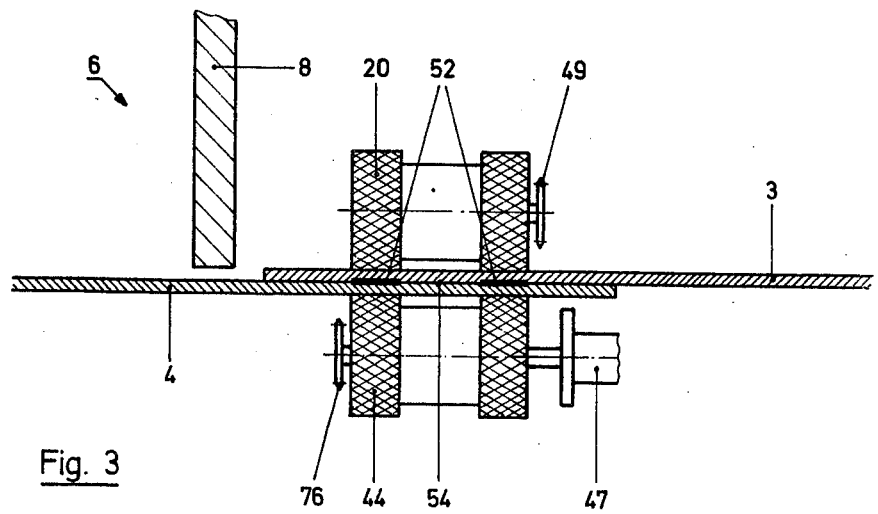
FIG. 3 is a purely schematic partial representation of a section of the welding device according to FIG. 1, sectioned along line III—III of FIG. 1.
Figure 4:
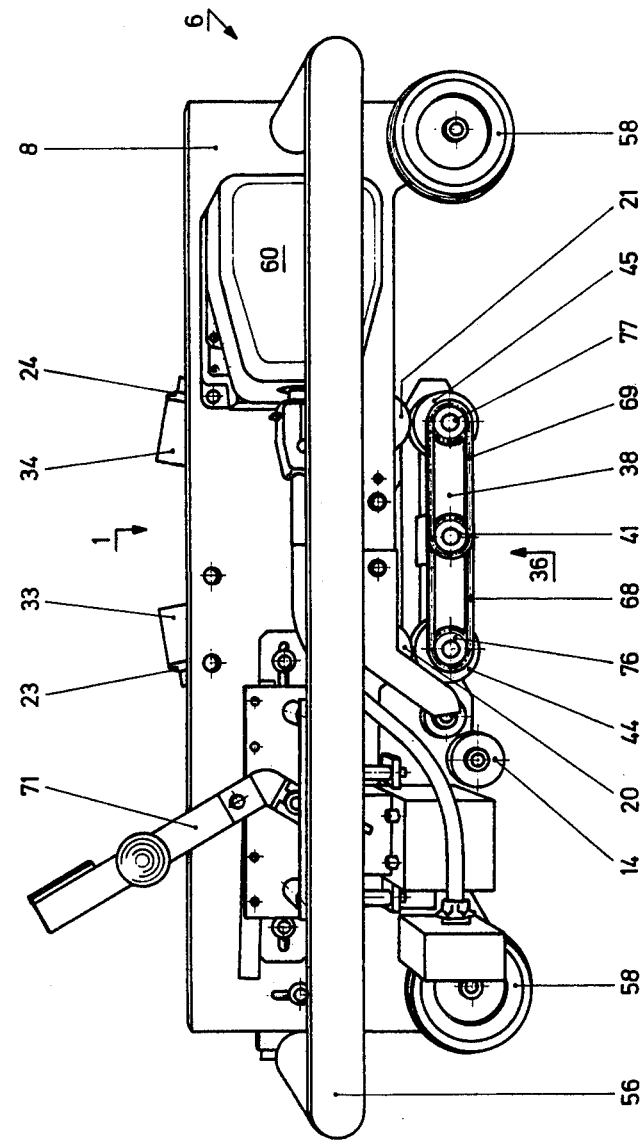
FIG. 4 is a side view of a preferred embodiment of the welding device of the present invention.
Figure 5:
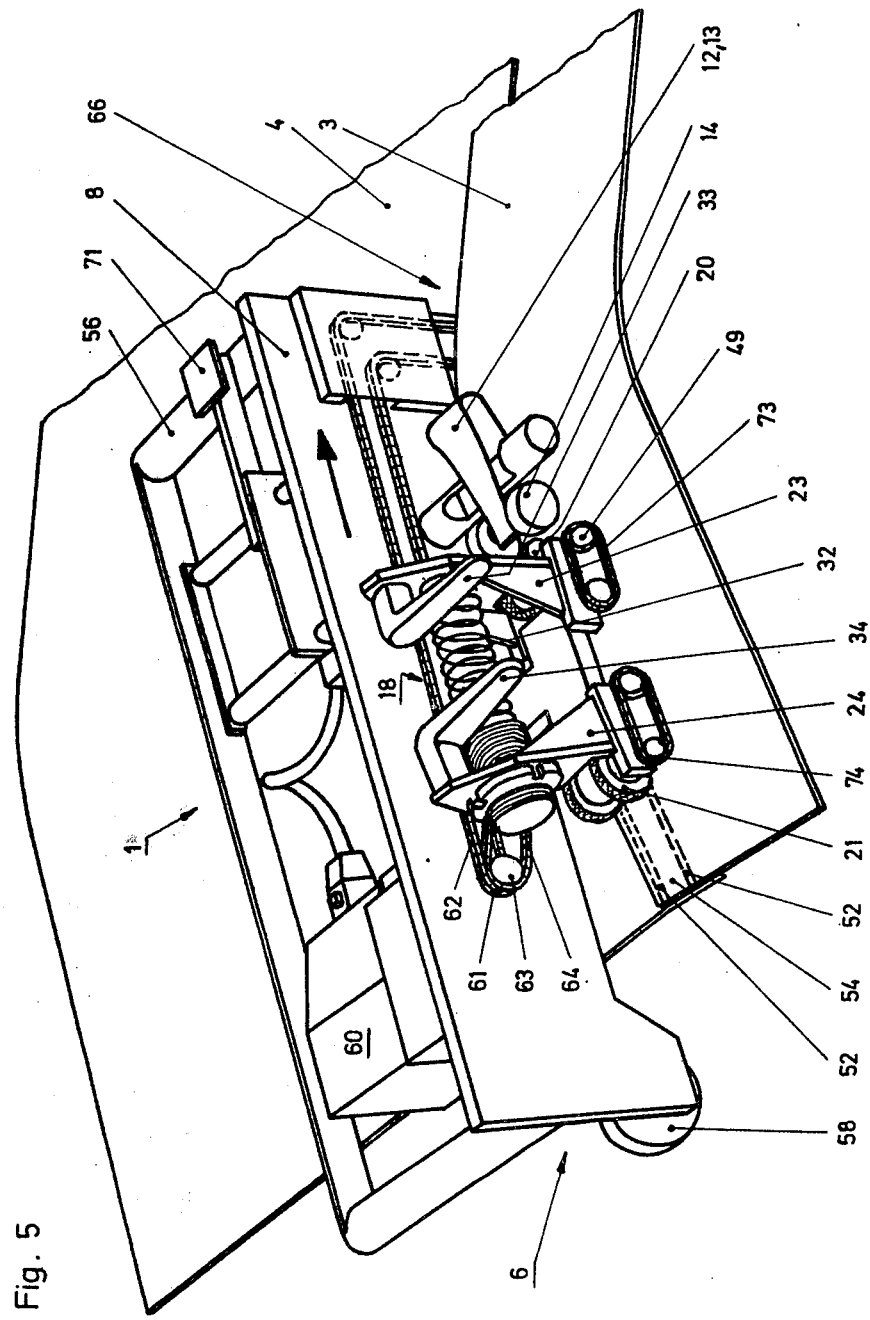
FIG. 5 is a perspective view from above of the welding device of FIG. 4 with plastic strips inserted.

A welding device, shown highly simplified in FIG. 1, is mounted in a welding position on an upper plastic strip 3 and a lower plastic strip 4, said plastic strips to be welded at their ends or edges. Welding device 1 is provided with a mounting frame 6, of which only a mounting plate 8 is partially shown in FIGS. 1 to 3 (FIGS. 4 to 6 also show this plate 8). The welding device 1 is preferably equipped with a heating wedge 10 for heating plastic strips 3 and 4 so that they can be welded together. In order to ensure good contact for uniform heating between this wedge 10 and the plastic strips 3 and 4 to be welded together, leaf springs 13 and pressure rollers 14 are mounted above and below the respective plastic strips as spring-loaded arms 12. A heating wedge housing 16 is located behind (in travel direction of device 1) heating wedge 10, into which heating wedge 10 can be retracted when the material being welded is inserted and removed from the welding device or to insert and remove the welding device from the plastic strips.

An upper welding carriage 18 is provided with a forward welding roller 20 and a rear welding roller 21. Said welding rollers 20 and 21 are mounted on respective angle levers 23 and 24. These angle levers 23, 24 are each swivelably mounted on respective bracket 26 and 27 associated with mounting frame 6, so that they can swivel around respective axes 29 and 30. An adjustable compression spring 32, mounted between angle levers 23 and 24, tends to continuously press the two welding rollers 20 and 21 uniformly against the upper surface of upper plastic strip 3. In order to remove the welding device from plastic strips 3 and 4, two handles 33 and 34 are provided, said handles facilitating raising of welding rollers 20 and 21 from strips 3 and 4 against the pressure of spring 32.

Figure 2:
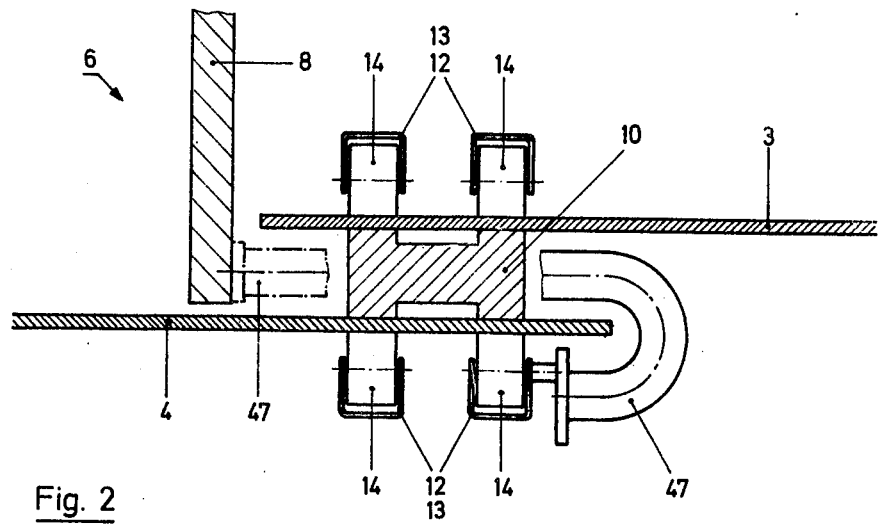
FIG. 2 is a purely schematic partial representation of a section through the welding device along line II—II in FIG. 1, omitting parts of the welding machine.

A lower welding carriage 36 is located directly below upper welding carriage 18. It is provided with two parallel arms 38, of which only one is visible. These arms are connected by a bracket 40 to the chassis of the lower welding carriage 36. Arms 38 are provided at their respective ends with a forward and a rear welding roller 44 and 45, while a double pinion drive 41 is shown schematically in the center of arms 38. The lower welding carriage 36 is mounted on the lower part of mounting frame 6. This is accomplished by means of a connecting arm 47, shown schematically, in the form of a "swan neck" (see also FIG. 6). The approximate shape of the swan neck is shown in FIG. 2. FIG. 3 schematically shows welding roller chain drives 49 and 76 for welding rollers 20 and 44, respectively. Referring to FIG. 3, the double seam 52 produced during lap welding of the two plastic strips 3 and 4 by appropriate shaping of welding rollers 20 and 44, as well as the unwelded part provided therebetween and designed to serve as a test channel 54 is shown. In order to ensure a proper grip of the welding rollers on the material to be welded, said rollers have knurled surfaces.

In the side view shown in FIG. 4 of a welding device as described, a portion of the parts shown in FIGS. 1 to 3 are visible and provided with the same reference numbers. In addition, FIG. 4 shows a frame 56 mounted on mounting frame 6 outside mounting plate 8, as well as wheels 58 mounted at the front and rear on mounting plate 8. These wheels 58 ride on top of plastic sheet 4 during welding operations (see also FIG. 5). A drive motor 60 is used to drive, i.e., advance the welding device. Beginning at drive motor 60 (FIG. 5), a first drive pinion 61 is mounted on the output shaft of the motor, said pinion being provided with a first chain drive 62 as well as a second drive pinion 63 with a second chain drive 64. The first chain drive 62 drives a pinion 66 to drive the lower welding carriage 36, as shown in detail with reference to FIG. 6 hereinbelow. FIGS. 4 and 6 show chain drive 68 to drive the forward welding roller 44 of lower carriage 36 as well as a chain drive 69 to drive corresponding rear welding roller 45. A clamping lever 71 serves to retract heating wedge 10 into heating wedge housing 16 in order to allow plastic strips 3 and 4 to be inserted without contacting hot heating wedge 10. In addition, two chain drives 73 and 74 are shown to drive welding rollers 20 and 21 of upper carriage 18, said chain drives being driven by the second drive pinion 63 and the second chain drive 64, as shown only schematically in FIG. 5.

FIG. 6 is a section through the lower welding carriage 36, with the corresponding drive elements and the elements connecting carriage 36 to mounting frame 6 of the welding device. Pinion 66 driven by the first chain drive 62 (FIG. 5) is provided with a bevel gear 80 via a shaft 79, said gear meshing with a bevel gear 81 and driving a shaft 82 with a bevel gear 83. Bevel gear 83 in turn meshes with bevel gear 84, thus driving shaft 85, at whose free end double pinion drive 41 is mounted (FIG. 4). The drives to gears 76 and 77 are actuated by the pinion drive 41 via chain drives 68 and 69, said gears 76, 77 in turn driving the shafts and the two welding rollers 44 and 45 connected therewith.

FIG. 6 shows both parts of mounting frame 6 and springs 13 made in the form of hairpin-shaped leaf springs, which simultaneously constitute arms 12, as well as pressure rollers 14 which are subjected to pressure by these springs.

Connecting arm 47, here shown in the form of a swan neck, constitutes a rigid connection between the lower welding carriage 36 and mounting frame 6, a design which makes it possible to grip from below the two plastic strips 3 and 4 in the manner shown in FIG. 5 (schematically shown in FIGS. 1 to 3) by means of lower carriage 36. Lower carriage 36 thereby constitutes a completely independent backing for upper welding carriage 18 with respect to the surface to be lined.

A welding device of this kind no longer requires support on the surface to be lined, but is supported solely and independently on the two plastic strips 3 and 4 to be connected, the two wheels 58 running on lower plastic strip 4 while swan neck 47 connects the lower welding carriage 36, not visible in FIG. 5, and the corresponding drive and mounting elements with mounting frame 6.

While FIG. 4 shows clamping lever 71 in the position in which the heating wedge 10 is located in the heating wedge housing 16, thus allowing plastic strips 3 and 4 to be inserted, FIG. 5 shows lever 71 in the folded-down position, in which heating wedge 10 is in the operating position. Handles 33 and 34 are also free, so that compression spring 32, as shown in FIG. 5, presses the two angle levers 23 and 24 and therefore welding rollers 20 and 21 on upper plastic strip 3; welding rollers 44 and 45 of lower carriage 36 serving as a backing.

In order to insert or remove plastic strips 3 and 4 with a welding device, heating wedge 10 is retracted into heating wedge housing 16. This allows the material to be welded to be inserted smoothly.

Heating wedge 10 can be readily withdrawn from the device for cleaning, the guidance of the heating wedge ensuring proper replacement relative to the welding carriage.

During the welding process, motor 60 drives welding device 1 via welding rollers 20 and 21, 44, and 45, heating wedge 10 heating plastic strips 3 and 4 so that they are soft enough to be welded together, heating those parts of the strips which are located in front of the welding rollers, and then driving the immediately following welding rollers 20 and 44, deforming the double weld 52 to match their shape. Between these welds 52, there is a test channel 54, to which a compressed air source can be connected to test the tightness of weld 52.

In the embodiment shown in FIGS. 7 and 8, the lower welding shoe (corresponding to carriage 36 and rollers 44, 45 of the FIGS. 1-6 embodiment) is made in the form of a welding roller 88 connected by a bearing 86 and an arm 87 to housing part 8. Welding roller 88 is driven via a drive shaft 90 supported at motor support 89, a chain drive 91, and corresponding chain wheels 92. The upper welding shoe (corresponding in function to carriage 18 and rollers 20, 21 of the FIG. 1 to 6 embodiment) is provided with a welding roller 93. Welding roller 93 is swivelably mounted on an upper drive shaft 95 via an arm 94 and is pressed against the material to be welded 3 and 4 as well as against lower welding roller 88 by a leaf spring 96. The upper welding roller 93 is driven via drive shaft 95, chain drive 97, and a reversing gear drive 98. In a manner analogous to the respective supports for welding rollers 88 and 93, a wedge-pressing roller 99 is fixedly mounted at bearing 86 and an additional pressure roller 100 is mounted in a spring-loaded fashion via a leaf spring 101. To improve the process of insertion of plastic strips 3 and 4, a heating part made in the form of a wedge 102 is provided which is retractable into wedge housing 16, and upper welding roller 93 and upper pressure roller 100 can be raised by means of a lever 103 and a rod 104.

Figure 11:
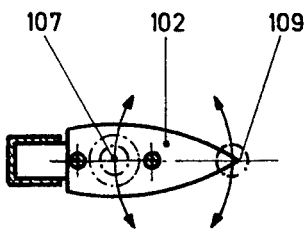
FIG. 11 shows the heating wedge in a side view with the two swivelling axes, taken along line XI—XI in FIG. 9.
Figure 10:
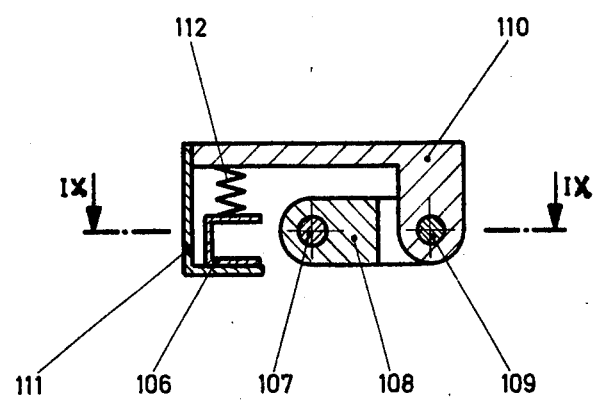
FIG. 10 is a structural schematic sectional view of the wedge mounting according to FIG. 9, sectioned along line X—X.
Figure 9:
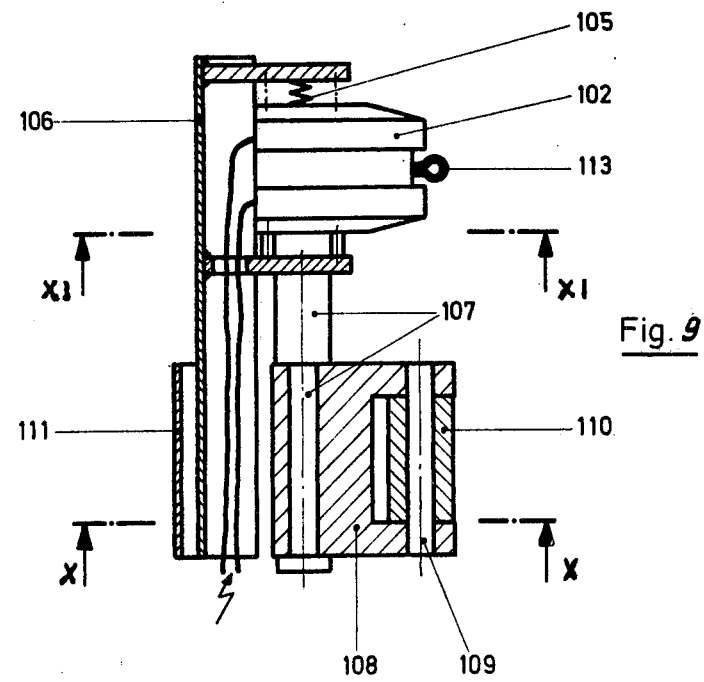
FIG. 9 is a partial schematic sectional representation of a new wedge mounting with wedge and weld-testing space according to the present invention, taken along line IX—IX in FIG. 10.

If wedge 102 were permanently mounted in one position, it would be impossible for accommodation to be provided for the thickness of the material constituting plastic strip 4. In order to overcome this disadvantage, wedge 102 is swivelably mounted. Hence, supported by the force exerted by spring 96 and 101, it can adjust to varying material thicknesses. FIG. 9 shows the wedge mounting. Wedge 102 is mounted in a spring loaded fashion in a holder 106 by springs 105 to allow for thermal expansion. Mounting 106 itself is mounted swivelably in an intermediate element 108 by means of a pin 107, said element 108 being mounted in turn via a pin 109 in a wedge-shifting device 110. This device 110 allows the above-mentioned retraction of wedge 102 into wedge housing 16, thereby facilitating the insertion of the plastic strips without coming in contact with the hot heating wedge 102. Pins 107 and 109 allow wedge 102 to remain nearly parallel to the rotational axes of welding rollers 88 and 93. However, wedge 102 is able to follow any vertical movement, both a swinging motion individually, around the axes of pins 107 or 109 (as shown in FIG. 11) as well as both swivelling movements simultaneously. In the resting position, i.e., especially when inserting plastic strips 3 and 4, wedge 102 is held in a clearly defined position against a stop 111 by a spring 112. In order to hold the test seam 54 (see FIG. 3 for schematic depiction) open reliably, a spacer 109, 113 is provided between welds 52 (wedge portion 102 in FIG. 9), the space between welds 52 being produced continuously in the welding process.

Since the heating wedge is kept operationally ready at all times by a temperature control means (not specifically shown), the melting process begins immediately after the welding device is applied in the manner described above. By operating a switch on the welding device, the motor 60 is actuated. This causes the welding device to begin moving and the process of melting and pressing together takes place continuously, the direct sequence not allowing any access to air and therefore permitting no oxidation.

It is also contemplated by the invention to have embodiments accommodating replacing of the welding rollers to produce a simple weld, wider if required, without a plurality of welds. Accordingly, the heating wedge can be replaced.

A welding device according to the invention provides for the production of a permanent, tight joining of two overlapping materials, especially thermoplastics. The weld is preferably capable of being tested for tightness with compressed air. In addition, the welding device should be capable of moving forward by its own agency with the strips standing still, at welding speeds, or for the strips to move at an appropriate speed with the device standing still. In addition, it is contemplated to be assemblable both as a left-handed or a right-handed device. In addition, it is preferred that the welding device of this kind is able to work with up to six thicknesses of the rated thickness of the material to be welded during the same work process.

A welding device according to the invention can be used on any backing, whether good or poor, in other words on gravel, sand, rock, rough concrete, or the like, since this backing is not critical for the quality of the weld.

The terms "upper" and "lower" in this specification and the appended claims are intended to connote relative positions of the plastic strips being welded together and the device parts and are not to imply that the welding device operates only in a horizontal plane. For example, a vertically extending weld could be made with the "upper" plastic sheet being the one engaged by the rollers 20, 21 and with the lower plastic sheet being the one engaged by the rollers 44, 45.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Welding device for the continuous welding together of overlapping edges of plastic strips or the like, said device comprising:

a mounting frame;

upper welding shoe means carried by said mounting frame and engageable in one direction with the edge of an upper strip to be welded;

lower welding shoe means carried by said mounting frame and engageable in the opposite direction with the edge of a lower strip to be welded, said lower welding shoe means serving as a backing for said strips;

connection means carried by said mounting frame for fixedly connecting said upper and lower welding shoe means, said connection means being configured to extend between said strips at a position upstream of the position of the welding together of said strips, whereby said device can be supported exclusively by the strips being welded and further whereby said device can continuously weld together overlapping edges of said plastic strips, irrespective of the length and width of said plastic strips; and a heating means carried by said mounting frame for heating the strips to be welded, said heating means being configured to produce a double weld with a weld test channel located therebetween.

2. Device according to claim 1, wherein the welding shoe means are provided with welding rollers.

3. Device according to claim 1, wherein the welding shoe means are made in the form of roller carriages.

4. Device according to claim 1, wherein said connection means is a curved swan neck shaped arm.

5. Device according to claim 2, wherein the welding shoe means are made in the form of roller carriages, and wherein at least a plurality of rollers are provided on the roller carriages which are driven by a central drive motor.

6. Device according to claim 4, wherein driving means are provided for driving said roller carriages along the strips being welded, and wherein said driving means includes at least one of chain drive means and gear drive means.

7. Device for welding plastic strips or the like to one another; said device comprising: a mounting frame; upper welding shoe means carried by said mounting frame and engageable with an upper strip to be welded; lower welding shoe means carried by said mounting frame and engageable with a lower strip to be welded; and a heating means carried by said mounting frame for heating the strips to be welded, wherein said heating means is configured to produce a double weld with a weld test channel located therebetween and further wherein said heating means is wedge-shaped and includes two spaced raised portions separated by a reduced portion, said raised portions heating the strips to be welded and said reduced portion aligning with the weld test channel during welding operations; and connection means for connecting said upper and lower welding shoe means, whereby said device can be supported exclusively by the strips being welded without requiring backing for said lower strip other than said lower welding shoe means.

8. Device according to claim 1, wherein said welding shoe means includes knurled welding rollers offset to produce said double weld and test channel.

9. Device according to claim 7, wherein said welding shoe means includes knurled welding rollers offset to produce said double weld and test channel.

10. Device according to claim 1, wherein a housing is provided to cover the heating means, and wherein means are provided for selectively moving said heating means between a strip heating position and a retracted position in said housing.

11. Device according to claim 1, wherein each of said welding shoe means include welding rollers, and wherein the upper welding rollers of said upper welding shoe means are forced by spring means toward the lower welding rollers of said lower welding shoe means, said lower welding rollers serving as a backing for the strips being welded.

12. Device according to claim 11, wherein each of said welding shoe means include respective carriages for carrying their respective welding rollers.

13. Device according to claim 1, wherein said welding shoe means include welding rollers engageable with said strips during welding operations, and wherein pressure rollers are provided ahead of the travel path of the welding rollers for pressing the strips against said heating means.

14. Device according to claim 13, wherein leaf spring means are provided for resiliently pressing said pressure rollers against said heating means.

15. Device according to claim 1, wherein support wheel means are provided on said mounting frame for supporting said device on said lower strip during welding operations, said support wheel means being separate from said welding shoe means and being engageable with said lower strip at a spacing from the weld being formed during welding operations.

16. Device according to claim 1, wherein said heating means is in the form of a wedge.

17. Device according to claim 2, wherein the upper welding shoe means includes a spring-loaded swivel arm.

18. Device according to claim 2, wherein the lower welding shoe means is provided with a lower welding roller, said lower welding roller being mounted in a bearing connected via an arm with said mounting frame.

19. Device according to claim 1, wherein said heating means is mounted to swivel around an axis extending transverse to the travel direction of said welding device during welding operations.

20. Device according to claim 1, wherein the heating means is swivelably mounted in a holder, said holder being mounted to swivel with respect to the mounting frame.

21. Device according to claim 1, wherein the heating means is made in the form of a wedge and is carried on a universal mount.

22. Device according to claim 17, wherein the lower welding shoe means is provided with a lower welding roller, said lower welding roller being mounted in a bearing connected via an arm with said mounting frame.

23. Device according to claim 22, wherein the heating means is swivelably mounted in a holder, said holder being mounted to swivel with respect to the mounting frame.

24. Device according to claim 1, wherein said heating means is wedge-shaped and includes two spaced raised portions separated by a reduced portion, said raised portions heating the strips to be welded and said reduced portion aligning with the weld test channel during welding operations.

25. Device according to claim 1, wherein said welding shoe means includes welding rollers spaced apart to produce said double weld with said weld test channel located therebetween.

26. Device according to claim 2, wherein said welding rollers are spaced apart to produce said double weld with said weld test channel located therebetween.

27. Welding device for the continuous welding together of plastic strips or the like, said device comprising:
 a mounting frame;
 a heating means carried by said mounting frame for the heating of the strips to be welded at a position upstream of the position of the welding together of said strips;
 an upper welding shoe means carried by said mounting frame and engageable with at least one strip to be welded;
 lower welding shoe means carried by said mounting frame and engageable with at least another strip to be welded, said lower welding shoe means serving as an exclusive backing for the strips to be welded during the welding step;
 wherein the heating means has a contact heating element formed in a wedge shape; and
 further wherein the welding shoe means are made in the form of roller carriages which are connected with each other via a bent swan-neck shaped arm or the like.

28. Welding device according to claim 27, wherein at least a plurality of rollers are provided on the roller carriages which are driven by a central drive motor including at least one of chain drive means and gear drive means.

29. Welding device according to claim 27, wherein the heating means and the welding shoe means are configured to produce a double weld with a weld test channel located therebetween.

30. Welding device according to claim 27, wherein a housing is provided to cover the heating means and wherein means are provided for selectively moving said heating means between a strip heating position and a retracted position in said housing.

31. Welding device according to claim 27, wherein each of said welding shoe means include welding rollers, and wherein the upper welding rollers of said upper welding shoe means are forced by spring means towards the lower welding rollers of the lower welding shoe means, said lower welding rollers serving as a backing for the strips to be welded.

32. Welding device according to claim 27, wherein said welding shoe means include welding rollers engageable with said strips during welding operations, and wherein pressure rollers are provided ahead of the travel path of the welding rollers for pressing the strips to be welded against the heating means, and wherein leaf spring means are provided for resiliently pressing said pressure rollers against said heating means.

33. Welding device according to claim 27, further comprising wheel means, connected to the mounting frame, for riding on the plastic strips to be welded.

34. Welding device for the continuous welding together of plastic strips or the like, said device comprising:
- a mounting frame;
- a heating means carried by said mounting frame for the heating of the strips to be welded at a position upstream of the position of the welding together of said strips;
- an upper welding shoe means carried by said mounting frame and engageable with at least one strip to be welded;
- lower welding shoe means carried by said mounting frame and engageable with at least another strip to be welded;
- said lower welding shoe means serving as an exclusive backing for the strips to be welded during the welding step;
- wherein said upper and lower welding shoe means both have welding rollers and are arranged in direct opposition to each other for holding together the heated strips to be welded; and
- wherein the heating means is swivelably mounted about an axis transverse to the travel direction of the welding device.

35. Welding device according to claim 34, wherein the upper welding shoe includes a spring-loaded swivel arm.

36. Welding device according to claim 34, wherein the lower welding shoe has lower welding rollers, which lower welding roller is mounted in a bearing connected to the mounting frame by way of an arm.

37. Welding device according to claim 34, wherein the heating means is swivelably mounted in a holder, said holder being mounted to swivel with respect to the mounting frame.

38. Welding device according to claim 34, wherein the heating means is made in the form of a wedge and is carried on a universal mount.

* * * * *